Dec. 29, 1964       H. JEFFREE       3,163,055
POWER-TRANSMISSION SYSTEMS
Filed July 26, 1961       4 Sheets-Sheet 2

INVENTOR
HERBERT JEFFREE
BY
Moss Nolte & Nolte
ATTORNEYS

Dec. 29, 1964  H. JEFFREE  3,163,055
POWER-TRANSMISSION SYSTEMS
Filed July 26, 1961  4 Sheets-Sheet 3

INVENTOR
HERBERT JEFFREE
By
Moses, Nolte & Nolte
ATTORNEYS

INVENTOR
HERBERT JEFFREE
BY
Moser, Nolte & Nolte
ATTORNEYS

United States Patent Office 3,163,055
Patented Dec. 29, 1964

3,163,055
POWER-TRANSMISSION SYSTEMS
Herbert Jeffree, Bridge Close, Byfleet, Surrey, England, assignor to Vickers-Armstrongs (Aircraft) Limited, London, England, a British company
Filed July 26, 1961, Ser. No. 127,027
10 Claims. (Cl. 74—501.5)

The invention for its object to provide, in apparatus including an actuator connected to a remote slave member two alternative channels capable of transmitting only tensional forces, an intermediate compensator which will provide positive actuation of the slave member without lost motion due to backlash, whilst accommodating deflections in the intervening structure, temperature changes or other varying conditions which may alter the effective distance between the actuator and the slave member.

The two channels between the actuator and the slave member are interrupted, being divided by the intermediate compensator each into two sections, i.e. an input section between the actuator and the compensator and an output section between the compensator and the slave member. Considered broadly, the compensator provided by the invention comprises two members on a common floating pivot, one end of each such member being connected to one of said input sections, and the other end of each such member being connected to one of said output sections. The compensator further comprises means for resiliently constraining the members thereof to partake of relative angular movement whereby tension is constantly exerted in both input and output sections of each channel.

Figure 1:
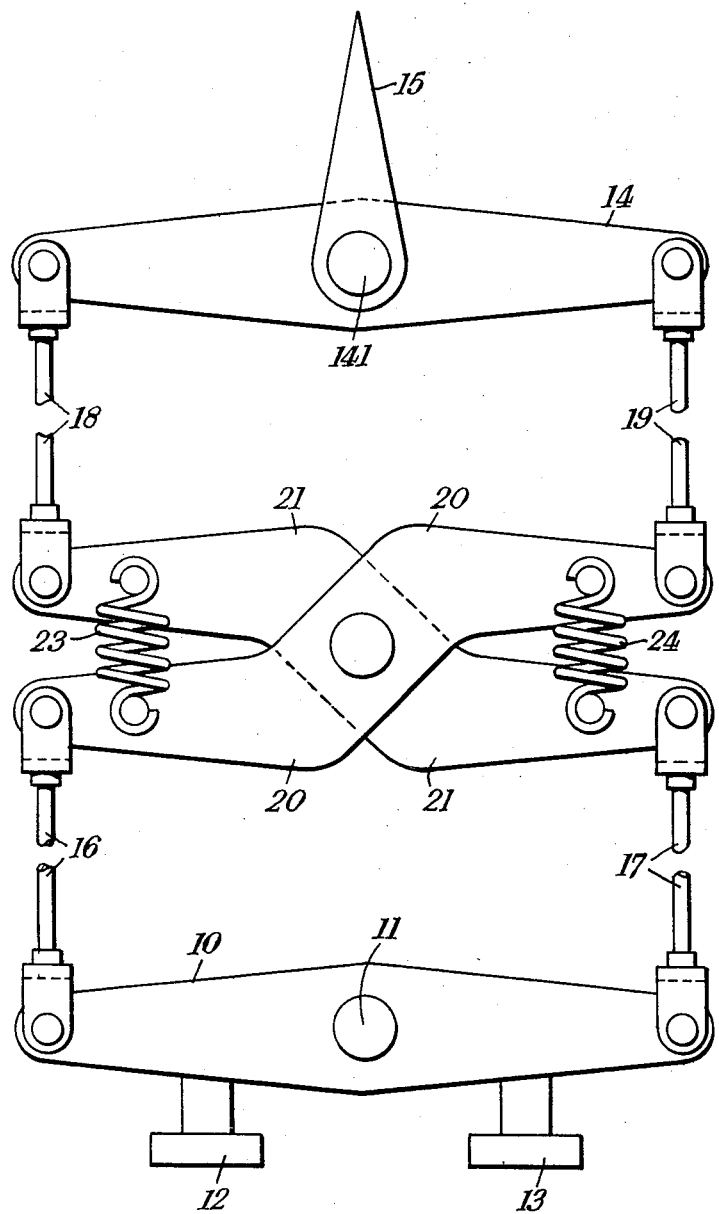
Figure 3:
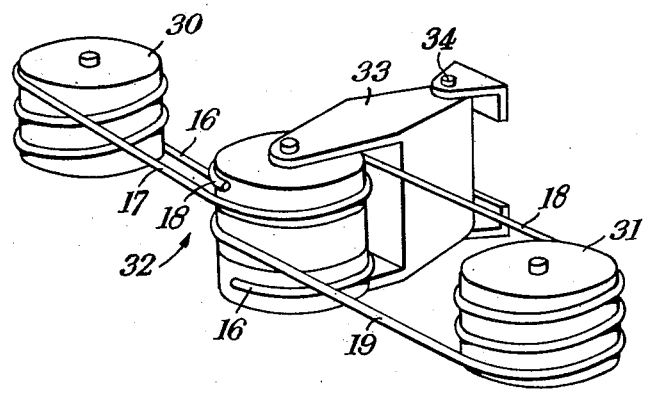
Figure 2:
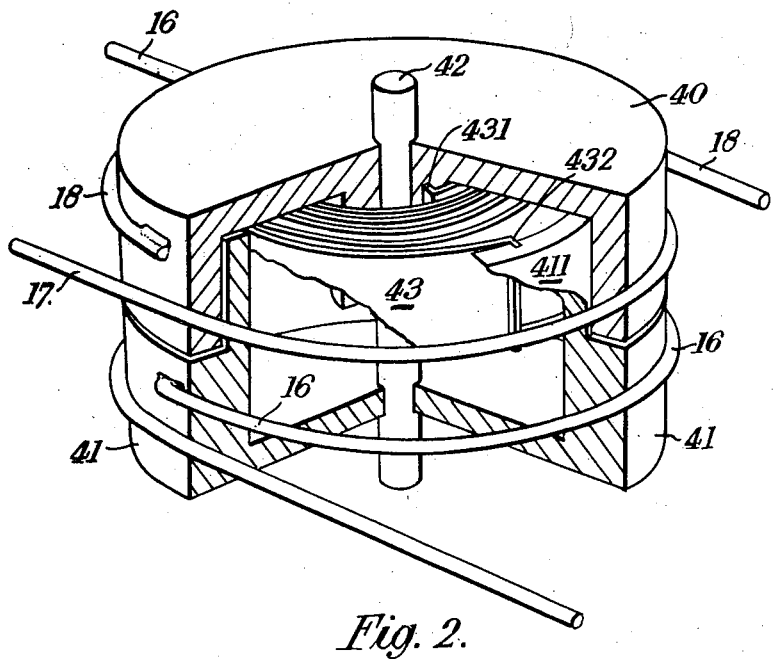
Figure 4:
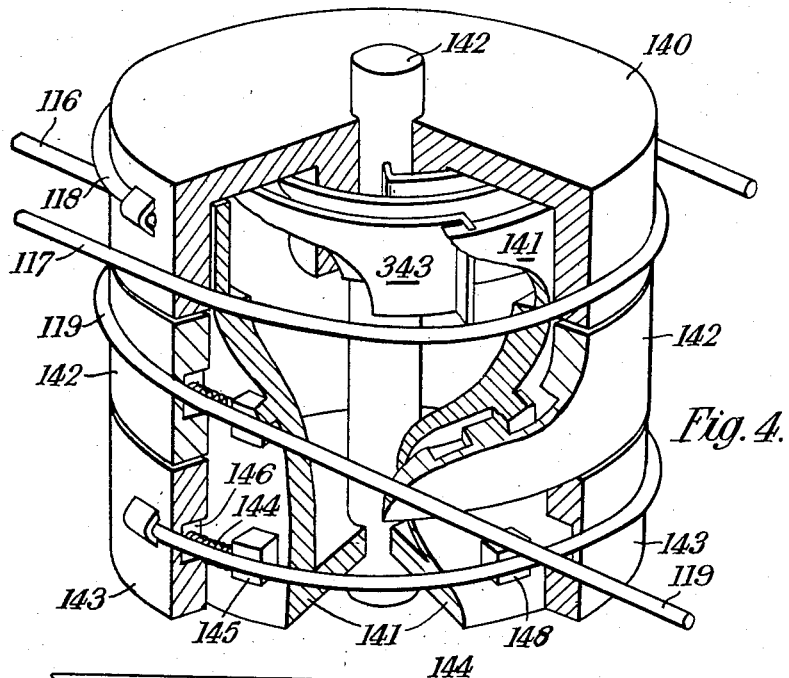
Figure 5:
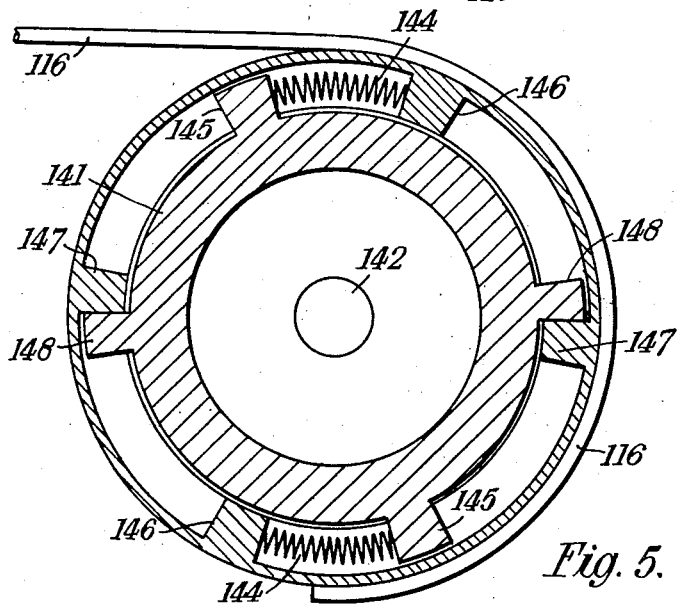
Figure 6:
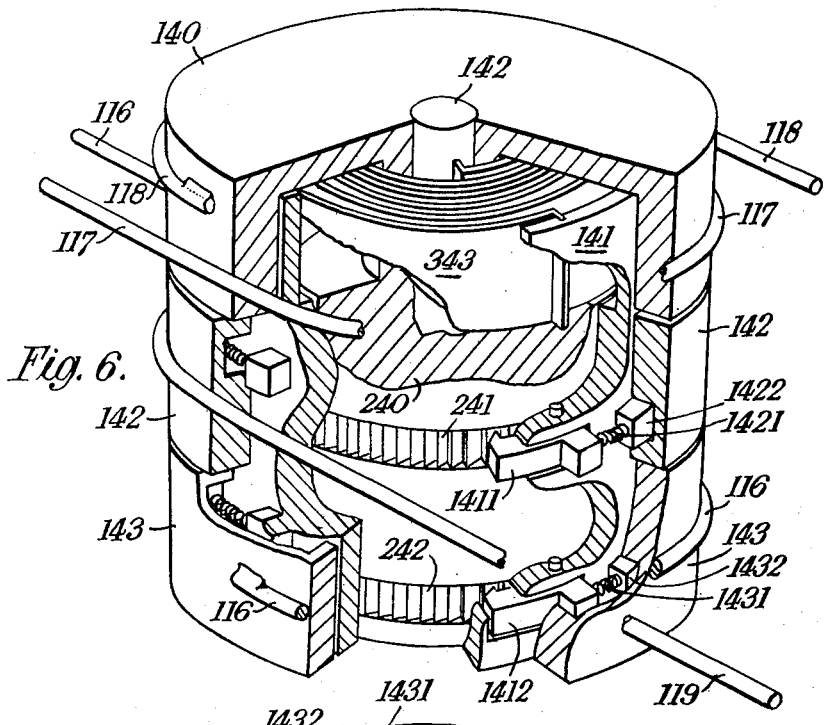
Figure 7:
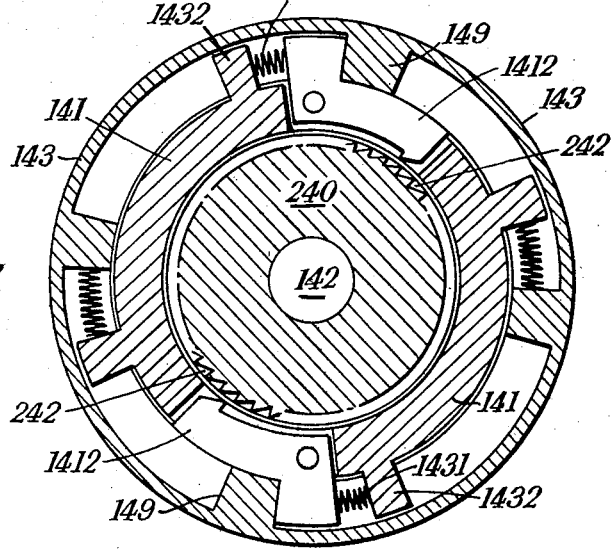

The manner in which the invention may be carried into effect is hereinafter described in greater detail with reference to the accompanying drawings, in which FIG. 1 is a plan of a mechanical control circuit for an aircraft rudder, FIG. 2 is a partly sectional perspective view of an alternative embodiment, and FIGS. 3, 4 and 5 illustrate a further modification, FIG. 3 being a general perspective view of the circuit, FIG. 4 an enlarged perspective view of the compensator unit itself drawn to a larger scale and partially sectional to depict the mode of its construction, and FIG. 5 a transverse section of the compensator unit taken to illustrate the spring and stop components thereof. FIGS. 6 and 7 are views similar to FIGS. 4 and 5 of still another modified embodiment of the invention.

In the circuit shown in FIG. 1, the actuator consists of a rudder-bar 10, pivotally mounted at 11 upon the airframe (not shown) and having pedals 12, 13 for its operation in conventional fashion by the pilot. The remote slave member to which the rudder-bar 10 is connected through the circuit apparatus provided by this invention is the tiller 14, which carries the rudder 15 and is mounted for rotary movement about the axis 141. The rudder-bar 10 is connected to the tiller 14 through two channels which respectively include two input cables 16, 17, and two output cables 18, 19, the input cables being connected to the output cables by a compensator unit, which operates to correct variations in the effective distance between the axes 11 and 141. Said compensator comprises two first-order levers 20 and 21 which are pivoted together for movement about a floating pivot axis 22 in scissor-fashion, the lever 20 being connected at one end to the input cable 16 and at the other end to the output cable 19, whilst the lever 21 is connected at one end to the input cable 17 and at the other end to the output cable 18. Tension springs 23 and 24 are strained between the adjacent pairs of limbs of the two levers 20, 21 as shown.

The effect of said springs 23, 24 is to impose a resilient constraint upon the compensator levers 20, 21, so that in the event of a change in the distance between the axes 11 and 141, said levers will be caused to partake of relative angular movement whereby tension is constantly exerted in both the input cables, and thereby satisfying the essential requirement that both channels are maintained in a condition such that the input movements of the rudder-bar 10 are effectively reproduced in the movement of the tiller 14. Due to the floating condition of the pivot axis 22 of the compensator levers 20, 21, the algebraic sum of the loads in the two input cables 16, 17 always balances that of the loads in the two output cables 18, 19, and the freedom of the levers 20, 21 to rotate ensures that the moment applied by the difference between the two input loads shall balance the moment representing the difference between the two output loads. These considerations maintain equality in the loading of the cables 16 and 18, and of the cables 17 and 19.

In the embodiment illustrated in FIG. 2, the compensator unit, instead of taking the form of a pair of relatively pivotable double-armed levers as shown in FIG. 1, comprises the mechanically equivalent arrangement of two substantially cylindrical drums 40 and 41, which are mounted upon a common shaft 42 so as to be capable of relative rotation. The drums are connected by a coil spring 43, one end of which is anchored to the drum 40 at 431 whilst the other end is attached at 432 to the internal sleeve-like part 411 of the drum 41. One input cable 16 is wound around part of the peripheral surface of the drum 41 and is attached thereto at 161. The other input cable 17 is similarly wound partly around and attached to the drum 40. The output cables 18 and 19 are respectively attached to and wound partly around the drums 40 and 41.

Tensional forces in the input and output cables attached to each drum tend to turn that drum in the same direction, and the sum of their moments is reacted by the spring 43, so that with the circuit in a condition of equilibrium the spring 43 is balanced by equal loads in both channels, an increment of load in one input cable being accompanied by an equal decrement in the other, and the sum of the effective lengths of the two channels remains constant, requiring no resultant relative rotation of the drums 40, 41.

When the load in one input cable, say the cable 16, becomes sufficient to balance the whole initial load in the spring 43, the load in the other input cable 17 will have fallen to zero, and any further input movement tending to increase the load will merely rotate the drums 40, 41 relatively to each other in opposition to the force exerted by the springs 43, without increasing the actual applied load at the output beyond that given by the spring. In certain circumstances such an arrangement is advantageous for the reason that it prevents overloading in any part of the circuit. Other instances, however, when the ability to apply an emergency overload may be desirable, e.g. for the purpose of releasing an iced-up aircraft control organ, are hereinafter described with reference to FIGS. 6 and 7. It may also be required to take up slack in a cable, so that the tension in none of the control cables will actually diminish below some small positive value. This condition is achieved by the modified embodiment which is illustrated in FIGS. 3 to 5, in which in each channel either the input or the output cable is attached to a separate ring which is rotatable on one of the drums. The rings, being lightly sprung relative to their drums, have a tendency to wind in the very lightly loaded cables and maintain the small loading therein, although when an input load moves a ring in opposition to its spring, the ring will be arrested after a predetermined degree of angular movement by a stop on its drum by which further relative movement between ring and drum in that direction is prevented.

A general perspective view of this form of apparatus is shown in FIG. 3, and it will be seen that the input member or actuator, and the output or slave member, respectively take the form of sheaves 30 and 31 which are mounted for rotary movement about fixed axes, whilst the compensator unit (indicated generally at 32) is supported in a floating condition between the actuator and slave sheaves 30, 31 by a structure 33 which is free to swing about a fixed axis 34 which is parallel to the axis of the compensator unit 32.

The compensator unit comprises a drum 140, which is substantially identical with the drum 40 of the embodiment shown in FIG. 2, and which is mounted on a shaft 142. Also mounted on said shaft and capable of rotary movement relative to the drum 140 is a second drum 141 which is enclosed partially within the drum 140. A coiled spring 343 is connected to both drums as in the case of the spring 43. The drum 141 carries on its peripheral surface two independently rotatable rings 142 and 143.

In this case the input cables are constituted by a single cable which is coiled about the sheave 30 and of which the ends are indicated at 116, 117. The part 117 is wrapped around and secured to the drum 140, whilst the part 116 is wrapped around and secured to the lower ring 143. Similarly, there is a single output cable, which is coiled about the sheave 31 and of which the ends are indicated at 118, 119, the part 118 being wrapped around and secured to the drum 140, whilst the part 119 is wrapped around and secured to the upper ring 142.

The sectional view shown in FIG. 5 depicts the manner in which the rotary motion of the rings 142, 143 upon the drum 141 is restricted; this figure illustrates only the ring 143, but it will be understood that the arrangement of the ring 142 is similar. The drum 141 carries two diametrically disposed radial lugs 145, 145, whilst the ring 143 is provided with two diametrically disposed inward lugs 146. Springs 144 are compressed between each adjacent pair of lugs 145, 146, as shown so that in the event of the tension in the cable 116 falling below a value such that it no longer overbears the compression of the springs 144, said springs operate to rotate the ring 143 upon the drum 141.

In normal operation, the load in the cable 116 will be carried by the stops 147 bearing on the lugs 148. As the load in the cable 117 is increased, the load in the cable 116 falls until it reaches a low positive value at which the ring 143 is allowed to rotate relatively to the drum 141, thereby preventing a further decrease in the tension in said cable 116. Further effort in the channel of cable 117 causes the drums 140, 141 to rotate relatively to each other in opposition to the springs 343, without substantially increasing the load in that channel, the movement of the ring 143 on the drum 141 winding in under a light load the corresponding cable 116 of the oother channel which would otherwise slacken completely. The translational movement of the compensator about the axis 34 and the rotation of the drums serve to maintain a small degree of tension in the cables 116, 118, winding in the cable 118 as may be necessary.

In the modification shown in FIGS. 6 and 7, which permits the deliberate application of an over-load, however, the movement of the rings 142, 143 upon the drum 141 is employed to lock and unlock the drums 140, 141 to prevent or permit their relative rotation. In this embodiment an internal body-portion 240 of the drum 140 is provided on its periphery with two axially spaced bands of ratchet teeth, 241, 242. Mounted on the drum 141 and arranged to cooperate respectively with said ratchet bands 241, 242 are two pawls 1411 and 1412, and springs 1421, 1431, which are compressed between offsets 1422, 1432, on the drum 141 and the tails of the respective pawls, operate to urge the pawls into engagement with the ratchet bands. Thus, the function of said pawls is to prevent relative rotary motion between the drums 140, 141 except when they are disengaged by abutment against the stop 149 of a rotating ring, which is the normal state of working when overloading is not required.

Since the rings 142, 143 are attached to cables in different channels, each will actuate a pawl 1411 or 1412 to lock the drums 140, 141 together when the operating load in the particular channel pertaining to that pawl falls to a predetermined low value, and corresponding to maximum normal load in the other channel.

It will be noted that when the over-loading facility is in use, the stiffness of the apparatus is that of one cable, whereas when the compensator is in action the stiffness is that of both cables.

What I claim as my invention and desire to secure by Letters Patent is:

1. A mechanical power-transmission system, including an actuator connected to a remote slave member by two alternative channels capable of transmitting only tensional forces, said channels being interrupted by a compensator dividing each channel into an input section and an output section, said compensator comprising two members, each having two spaced attachment points and arranged for relative rotation about a common pivot axis situated intermediate the attachment points of both members, said common pivot axes having a component of freedom of motion along the direction of said tension members, one attachment point of each said member being connected to one of said input sections and the other attachment point being connected to one of said output sections, and means operatively connected with said compensator for resiliently restraining said members to partake of relative angular movement about said pivot axis whereby tension is constantly exerted in both input and output sections of each channel.

2. A power transmission system according to claim 1, wherein said members are first-order levers.

3. A power-transmission as claimed in claim 1, wherein the actuator and slave member each consist of a double-armed lever mounted on a fixed pivot, the arms of said levers being connected by tension elements to the members of the compensator, said actuator being adapted to have operating movements applied thereto, and the slave member being operatively connected with an object to be motivated.

4. A power-transmission system as claimed in claim 1, wherein the resilent constraining means of the compensator members includes a tension spring connected between the input attachment point of each member and the output attachment point of the other member.

5. A power-transmission system as claimed in claim 1, wherein the actuator and slave member each consist of a sheave, a single cable wrapped about the actuator sheave forming the input sections of both channels and a single cable wrapped about the slave member sheave forming the output sections of both channels.

6. A power-transmission system as claimed in claim 1, wherein the pivoted member assembly of the compensator comprises two drums mounted for relative rotary movement on said pivot axis capable of movement between the actuator and the slave member, said drums being spring-loaded so as to be constantly urged to rotate in opposite directions, the input and output sections of said two channels comprising flexible connectors anchored to points on the peripheries of the respective drums and wrapped partially about the same for imparting rotary movement thereto when subjected to tensional forces exerted at the actuator.

7. A power transmission system according to claim 6, wherein said actuator and slave member each consist of a sheave, a flexible connector wrapped about the actuator sheave forming the input sections of both channels and a flexible connector wrapped about the slave member sheave forming the output sections of both channels.

8. A power-transmission system as claimed in claim 6, wherein in each channel one of the connectors is attached to a separate ring rotatably mounted on one of the drums, resilient driving means being provided between each ring and its drum, together with angularly spaced stop means for limiting the extent of independent rotation permitted to each ring.

9. A power-transmission system as claimed in claim 8, including in operative relationship with each ring, means for releasably coupling the drums together against relative rotation.

10. A power-transmission system as claimed in claim 9, wherein said means for releasably coupling comprise two axially spaced ratchet bands on one of the drums and two pawls on the other drum, respectively adapted for engagement with one of said ratchet bands, the pawls being spring-loaded so as to lock the drums against relative rotation when the normal load in the cable anchored to the related ring falls below the value necessary to overcome the spring.

References Cited by the Examiner

UNITED STATES PATENTS

| Re. 20,539 | 10/37 | Mueller | 244—83 |
| 1,976,479 | 10/34 | Butler | 244—83.7 |
| 2,371,130 | 3/45 | Cushman | 74—501.5 |
| 2,617,315 | 11/52 | McClelland | 74—95 X |
| 2,625,349 | 1/53 | Speer | 244—83 |
| 2,921,480 | 1/60 | Wrighton et al. | 74—501.5 |

BROUGHTON G. DURHAM, *Primary Examiner.*

MILTON KAUFMAN, *Examiner.*